US012580478B2

(12) United States Patent
Ham

(10) Patent No.: US 12,580,478 B2
(45) Date of Patent: Mar. 17, 2026

(54) CONVERTER INCLUDING A SNUBBER CIRCUIT INCLUDING A PLURALITY OF INDUCTORS

(71) Applicant: LG ENERGY SOLUTION, LTD., Seoul (KR)

(72) Inventor: Seok Hyeong Ham, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 192 days.

(21) Appl. No.: 18/565,024

(22) PCT Filed: Jul. 25, 2022

(86) PCT No.: PCT/KR2022/010909
§ 371 (c)(1),
(2) Date: Nov. 28, 2023

(87) PCT Pub. No.: WO2023/013948
PCT Pub. Date: Feb. 9, 2023

(65) Prior Publication Data
US 2024/0266949 A1 Aug. 8, 2024

(30) Foreign Application Priority Data
Aug. 2, 2021 (KR) ........................ 10-2021-0101622

(51) Int. Cl.
*H02M 1/34* (2007.01)
*H02J 7/02* (2016.01)
*H02M 3/158* (2006.01)
(52) U.S. Cl.
CPC ................. *H02M 1/34* (2013.01); *H02J 7/02* (2013.01); *H02M 3/158* (2013.01)

(58) Field of Classification Search
CPC ............. H02M 1/34; H02M 3/158; H02J 7/02
See application file for complete search history.

(56) References Cited

U.S. PATENT DOCUMENTS

2005/0226012 A1 10/2005 Jovanovic et al.
2006/0028186 A1 2/2006 Yan
(Continued)

FOREIGN PATENT DOCUMENTS

CN 204131391 U 1/2015
CN 111953204 A 11/2020
(Continued)

OTHER PUBLICATIONS https://worldwide.espacenet.com/patent/search/family/056020406/ publication/KR20160049374A?q=pn%3DKR20160049374A.*
(Continued)

*Primary Examiner* — Rafael O De Leon Domenech
(74) *Attorney, Agent, or Firm* — Birch, Stewart, Kolasch & Birch, LLP

(57) ABSTRACT

Discussed is converter that may include a first inductor connected to a power source at a first node, a second inductor connected to the first inductor at a second node, a third inductor connected to the first inductor at the first node and the second node, a switch connected in series to the second inductor at a third node, a first diode connected to the second inductor and the switch at the third node, a first capacitor connected to the first inductor and the second inductor at the second node and connected to the first diode at a fourth node, a fourth inductor connected to the first diode and the first capacitor at the fourth node, a second diode connected to the fourth inductor at a fifth node, and a resistor connected to the second diode at a sixth node.

15 Claims, 9 Drawing Sheets

(56)     References Cited

U.S. PATENT DOCUMENTS

| | | | |
|---|---|---|---|
| 2012/0114009 | A1 | 5/2012 | Melvin et al. |
| 2013/0300390 | A1 | 11/2013 | Lee et al. |
| 2015/0002128 | A1 | 1/2015 | Cho |
| 2019/0173385 | A1 | 6/2019 | Park et al. |
| 2023/0132923 | A1 | 5/2023 | Park et al. |

FOREIGN PATENT DOCUMENTS

| | | | | | |
|---|---|---|---|---|---|
| JP | 2006-121850 | A | | 5/2006 | |
| JP | 2012-100525 | A | | 5/2012 | |
| KR | 10-1349906 | B1 | | 1/2014 | |
| KR | 20160049374 | A | * | 10/2014 | .............. G05F 1/70 |
| KR | 10-2016-0049374 | A | | 5/2016 | |
| KR | 10-1728938 | B1 | | 5/2017 | |
| KR | 10-1803539 | B1 | | 11/2017 | |
| KR | 10-2019-0064963 | A | | 6/2019 | |
| KR | 10-2005880 | B1 | | 10/2019 | |
| KR | 10-2045156 | B1 | | 11/2019 | |
| KR | 10-2021-0083649 | A | | 7/2021 | |
| KR | 10-2021-0083744 | A | | 7/2021 | |

OTHER PUBLICATIONS

International Search Report for PCT/KR2022/010909 mailed on Nov. 3, 2022.
Seok Hyeong Ham, "Study on a high efficiency Continuous-Critical-Conduction Mode Boost PFC converter using coupled inductor," Department of Electrical Engineering (Semiconductor Program), Pohang University of Science and Technology, 2015, 73 pages total, with English Abstract.

* cited by examiner

300

1000

CONVERTER INCLUDING A SNUBBER CIRCUIT INCLUDING A PLURALITY OF INDUCTORS

CROSS-REFERENCE TO RELATED APPLICATION

This application claims priority to and the benefit of Korean Patent Application No. 10-2021-0101622 filed in the Korean Intellectual Property Office on Aug. 2, 2021, the entire contents of which are incorporated herein by reference.

TECHNICAL FIELD

Embodiments disclosed herein relate to a snubber circuit, a converter including the same, and a battery charging apparatus.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium-ion batteries. Among the secondary batteries, a lithium-ion battery has a much higher energy density than those of the conventional Ni/Cd batteries, Ni/MH batteries, etc. Moreover, the lithium-ion battery may be manufactured to be small and lightweight, such that the lithium-ion battery has been used as a power source of mobile devices, and recently, a use range thereof has been extended to power sources for electric vehicles, attracting attention as next-generation energy storage media.

To charge a battery, a boost converter is used to accurately supply charging voltage and/or current. The boost converter is a switched mode power supply (SMPS), such that a ripple occurs in a charging current. The charging current ripple causes heat loss due to a resistance component of a battery cell, causing heat generation of a battery and thus shortening the lifespan of the battery. Capacities of a capacitor and an inductor may be increased as a scheme to reduce the charging current ripple, but hard switching may occur when the capacities of the capacitor and the inductor are increased, thus reducing efficiency.

DISCLOSURE

Technical Problem

Embodiments disclosed herein aim to provide a converter where an output current ripple is reduced.

Embodiments disclosed herein also aim to provide a snubber circuit capable of reducing the output current ripple.

Technical problems of the embodiments disclosed herein are not limited to the above-described technical problems, and other unmentioned technical problems would be clearly understood by one of ordinary skill in the art from the following description.

Technical Solution

A converter according to an embodiment disclosed herein includes a first inductor connected to a power source at a first node, a second inductor connected to the first inductor at a second node, a third inductor connected in parallel to the first inductor at the first node and the second node, a switch connected in series to the second inductor at a third node, a first diode connected to the second inductor and the switch at the third node, a first capacitor connected to the first inductor and the second inductor at the second node and connected to the first diode at a fourth node, a fourth inductor connected to the first diode and the first capacitor at the fourth node, a second diode connected to the fourth inductor at a fifth node, and a resistor connected to the second diode at a sixth node, in which the first inductor and the fourth inductor are coupled inductors.

In an embodiment, the switch may include a bipolar junction transistor (BJT) and a third diode.

In an embodiment, the switch may be short-circuited and opened for specific periods.

In an embodiment, the first diode may be connected in a direction from the third node to the fourth node.

In an embodiment, the second diode may be connected in a direction from the fifth node to the sixth node.

In an embodiment, a voltage applied to the resistor may be an output of the converter.

In an embodiment, the converter may further include a second capacitor connected in parallel to the resistor.

A snubber circuit according to an embodiment disclosed herein includes a capacitor, a first inductor connected to the capacitor at a first node, a second inductor connected to the capacitor at a second node, a third inductor connected to the capacitor and the first inductor at the first node, and a diode including one end connected to the third inductor at a third node and another end connected to the capacitor and the second inductor at the second node, in which the first inductor and the second inductor are coupled inductors.

In an embodiment, the diode may be connected in a direction from the third node to the second node.

In an embodiment, the snubber circuit may be included in a boost converter.

Advantageous Effects

A converter according to an embodiment disclosed herein may reduce a ripple of an output current to reduce heat generation of a battery, thereby preventing over-charging and reducing a switching loss.

A snubber circuit according to an embodiment disclosed herein may be included in a boost converter, thereby reducing the ripple of the output current.

Moreover, various effects recognized directly or indirectly from the disclosure may be provided.

MODE FOR INVENTION

Figure 1:
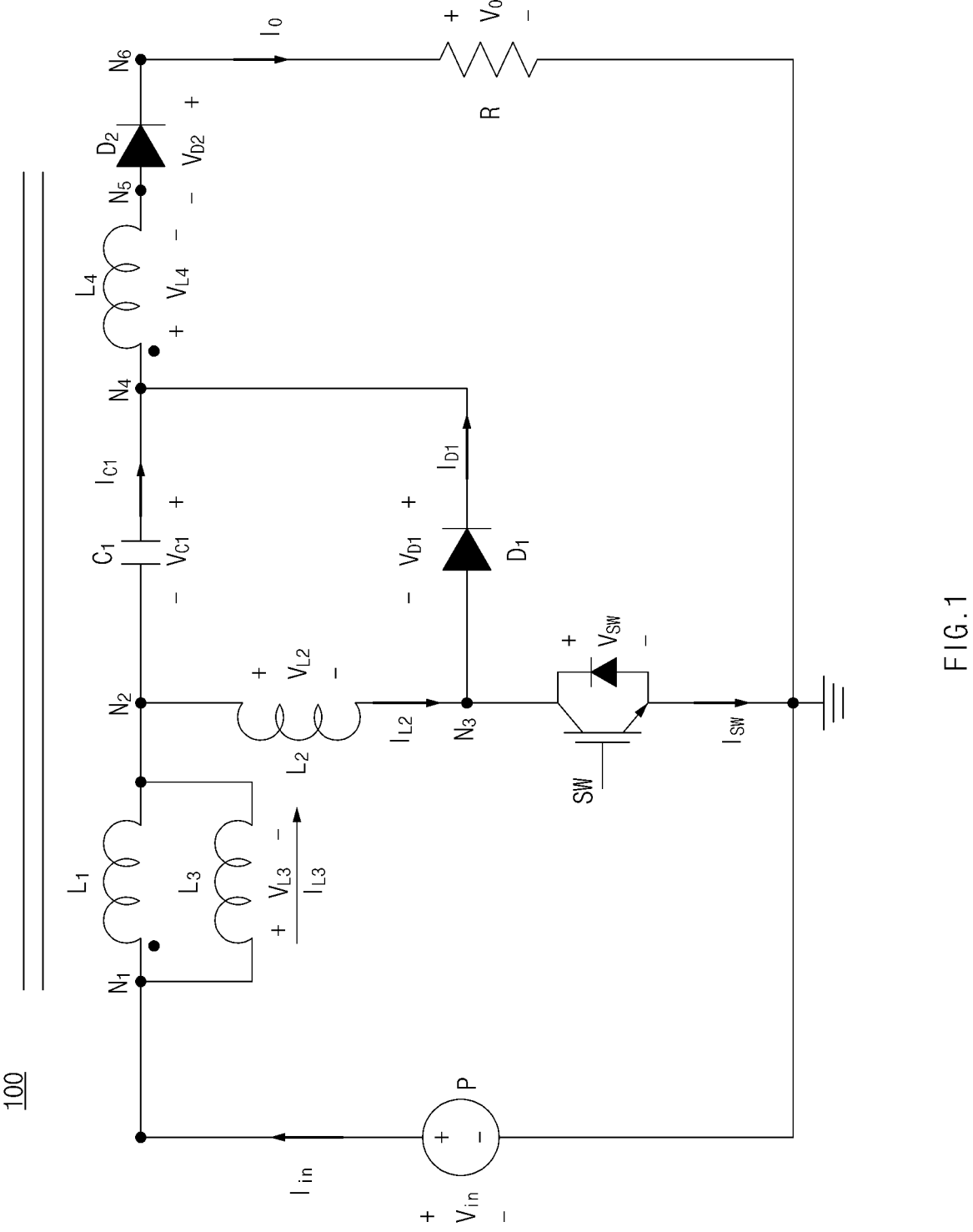
FIG. 1 is a diagram showing a converter according to an embodiment disclosed herein.

Hereinafter, various embodiments of the present disclosure will be described in detail with reference to the accompanying drawings. In this document, identical reference numerals will be used for identical components in the drawings, and the identical components will not be redundantly described.

For various embodiments of the present disclosure disclosed in this document, specific structural or functional descriptions are only exemplified for the purpose of describing the embodiments of the present disclosure, and various embodiments of the present disclosure may be implemented in various forms, and should not be construed as being limited to the embodiments described in this document.

As used in various embodiments, the terms "1st, "2nd", "first", "second", or the like may modify various components regardless of importance, and do not limit the components. For example, a first component may be named as a second component without departing from the right scope of the present disclosure, and similarly, the second component may be named as the first component.

Terms used in the present document are used for only describing a specific exemplary embodiment of the disclosure and may not have an intention to limit the scope of other exemplary embodiments of the disclosure. It is to be understood that the singular forms include plural references unless the context clearly dictates otherwise.

All of the terms used herein including technical or scientific terms have the same meanings as those generally understood by an ordinary skilled person in the related art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

FIG. 1 is a diagram showing a converter according to an embodiment disclosed herein.

Referring to FIG. 1, a converter 100 according to an embodiment disclosed herein may include inductors L1, L2, L3, and L4, a capacitor C1, diodes D2 and D2, a switch SW, and a resistor R.

A converter 100 may amplify or reduce a voltage supplied from a power source P and transmit the voltage to another device. In another example, the converter 100 may include a boost converter. In an embodiment, the power source P may supply a voltage $V_{in}$ to the converter 100 and a current $I_{in}$ may flow therethrough. In another embodiment, the power source P may supply a direct current (DC) voltage to the converter 100 as an external device.

The first inductor L1 may be connected to the power source P at a first node N1.

The second inductor L2 may be connected to the first inductor L1. In an embodiment, the second inductor L2 may be connected to the first inductor L1 at a second node N2. In an embodiment, a voltage $V_{L2}$ may be applied to the second inductor L2 and a current $I_{L2}$ may flow therethrough.

The switch SW may be connected to the second inductor L2. For example, the switch SW may be connected in series to the second inductor L2 at a third node N3. The converter 100 may be able to be zero-current turned on by the second inductor L2 connected in series to the switch SW. That is, the efficiency of the converter 100 may be increased by the second inductor L2 connected in series to the switch SW. In another example, the switch SW may include a bipolar junction transistor (BJT) and a third diode D3. In an embodiment, the voltage $V_{L2}$ may be applied to the switch SW and a current $I_{SW}$ may flow therethrough.

The third inductor L3 may be in parallel connected to the first inductor L1. For example, the third inductor L3 may be in parallel connected to the first inductor L1 at the first node N1 and the second node N2. In an embodiment, a voltage $V_{L3}$ may be applied to the second inductor L3 and a current $I_{L3}$ may flow therethrough.

The first capacitor C1 may be connected to the first inductor L1 and the second inductor L2. For example, the first capacitor C1 may be connected to the first inductor L1 and the second inductor L2 at the second node N2. In an embodiment, a voltage $V_{C1}$ may be applied to the second inductor C1 and a current $I_{C1}$ may flow therethrough.

The first diode D1 may be connected to the second inductor L2, the switch SW, and the first capacitor C1. For example, the first diode D1 may be connected to the second inductor L2 and the switch SW at the third node N3, and may be connected to the first capacitor C1 at a fourth node N4 In an embodiment, a voltage $V_{D1}$ may be applied to the second inductor D1 and a current $I_{D1}$ may flow therethrough. In an embodiment, the first diode D1 may be connected in a direction from the third node N3 to the fourth node N4.

The fourth inductor L4 may be connected to the first capacitor C1 and the first diode D1. For example, the fourth inductor L4 may be connected to the first capacitor C1 and the first diode D1 at the fourth node N4. The fourth inductor L4 and the first inductor L1 may be coupled inductors. In an embodiment, a voltage $V_{L4}$ may be applied to the fourth inductor L4. In an embodiment, the fourth inductor L4 and the first inductor L1 are coupled inductors, such that even when the switch SW is turned on, a current is allowed to flow to an output, thereby reducing an output current ripple.

The second diode D2 may be connected in series to the fourth inductor L4. For example, the second diode D2 may be connected to the fourth inductor L4 at a fifth node N5. In an embodiment, a voltage $V_{D2}$ may be applied to the second diode D2. In an embodiment, the second diode D2 may be connected in a direction from a fifth node N5 to a sixth node N6.

A resistor R may be connected to the second diode D2. For example, the resistor R may be connected to the second diode D2 at a sixth node N6. In an embodiment, a voltage $V_O$ may be applied to the resistor R and a current $I_O$ may flow therethrough. In this case, the current $I_O$ flowing through the resistor R may be the same as a current flowing through the fourth inductor L4 and the second diode D2. In an embodiment, the voltage $V_O$ applied to the resistor R may be an output of the converter 100. The output of the converter 100 may be a voltage used to charge the battery.

In an embodiment, the switch SW may be short-circuited and opened for specific periods. For example, the converter 100 may control the switch SW to be short-circuited and opened for specific periods, and set an interval for short-circuiting and opening the switch SW, thereby setting a ratio of an input voltage value $V_{in}$ to an output voltage value $V_o$.

Figure 2A:
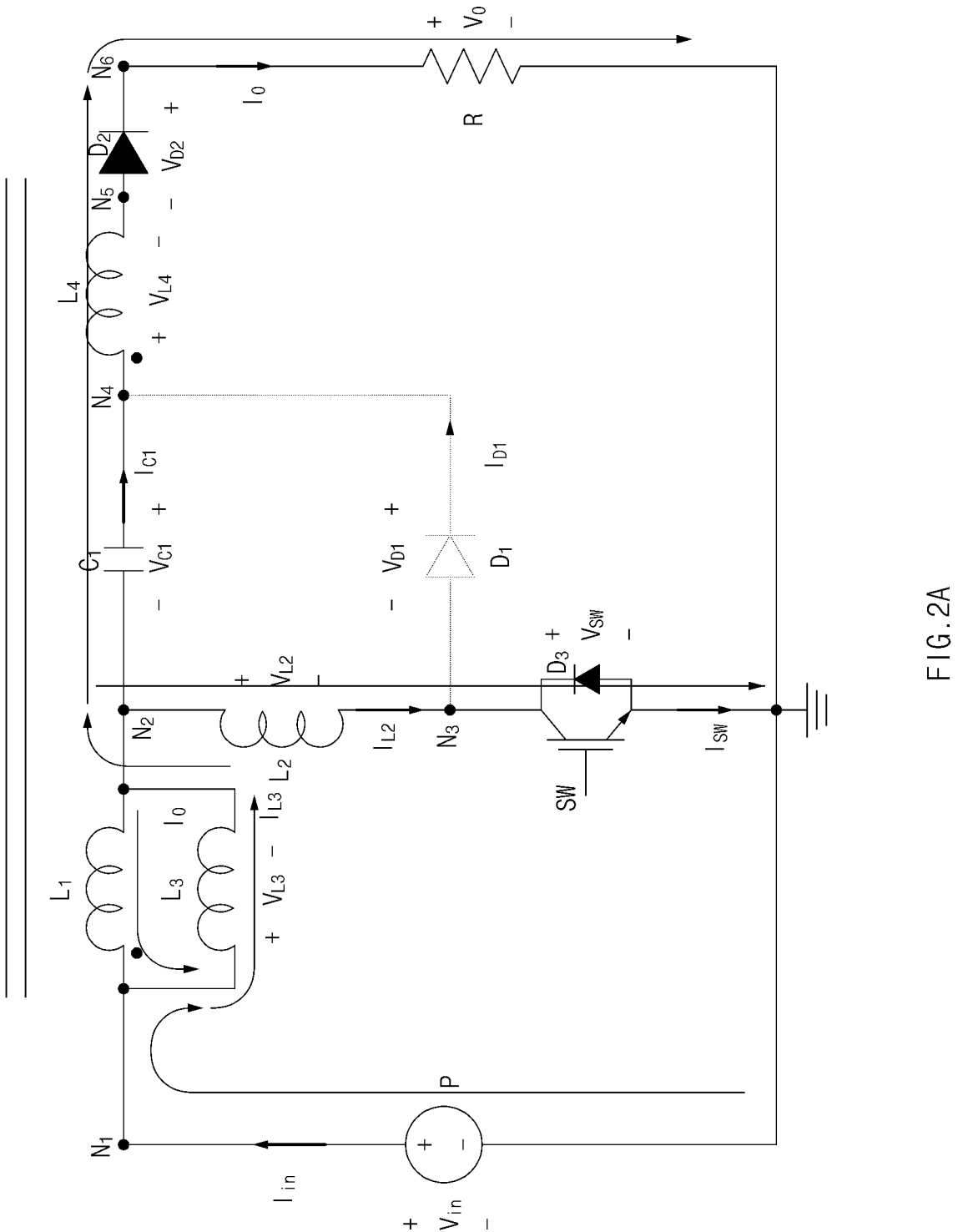
FIGS. 2A to 2C are diagrams showing an operation of a converter according to an embodiment disclosed herein.
Figure 2B:
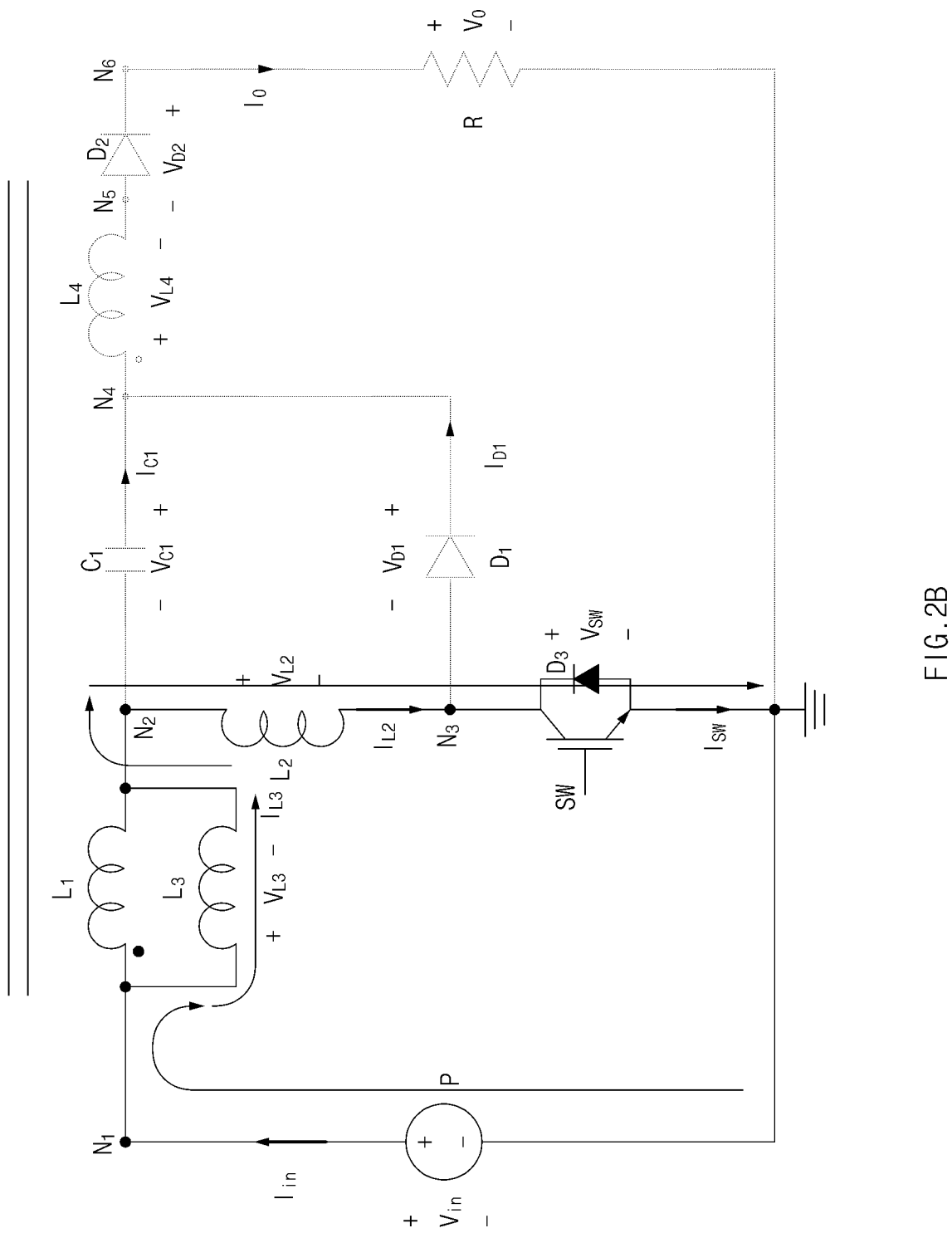
Figure 2C:
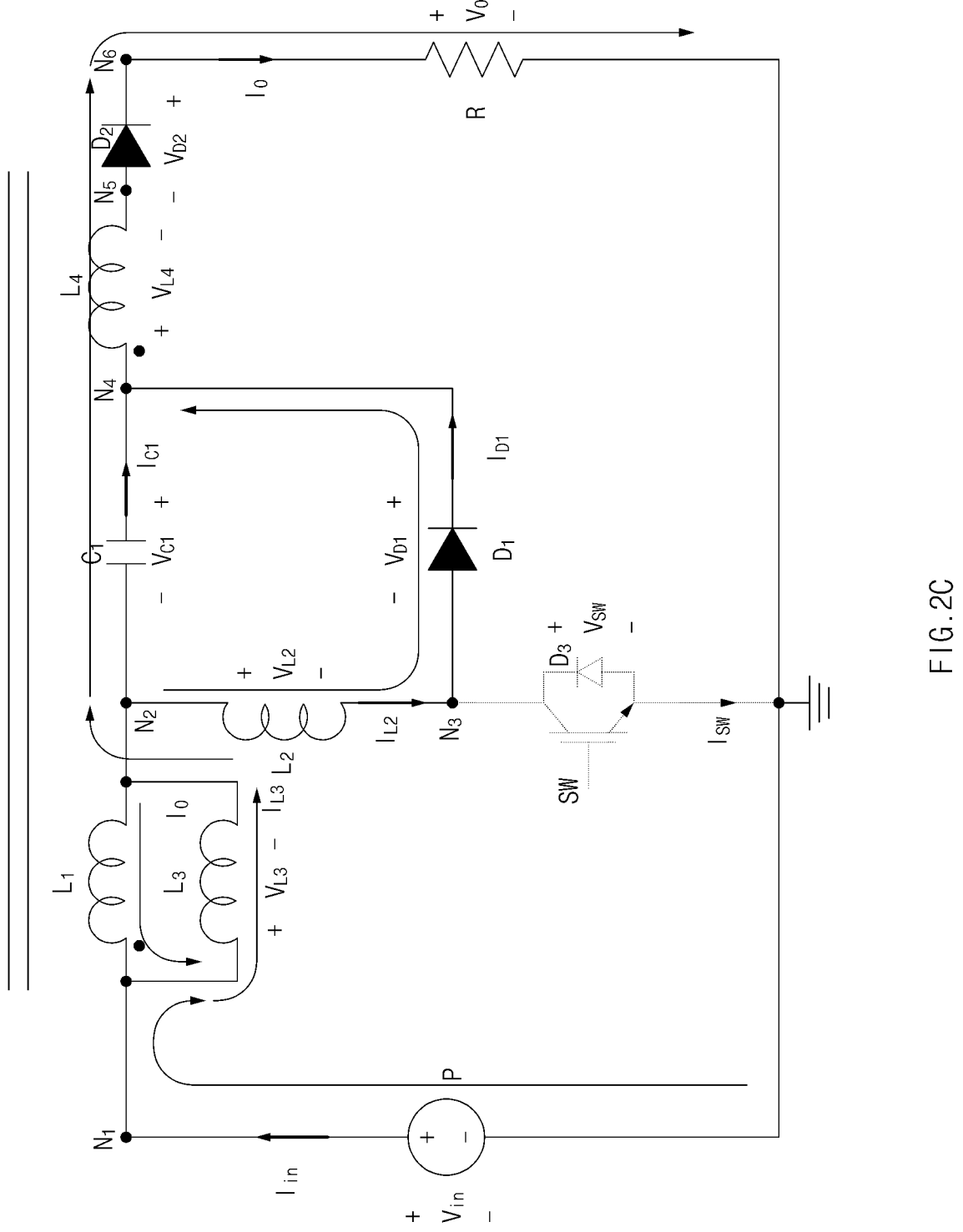
Figure 3:
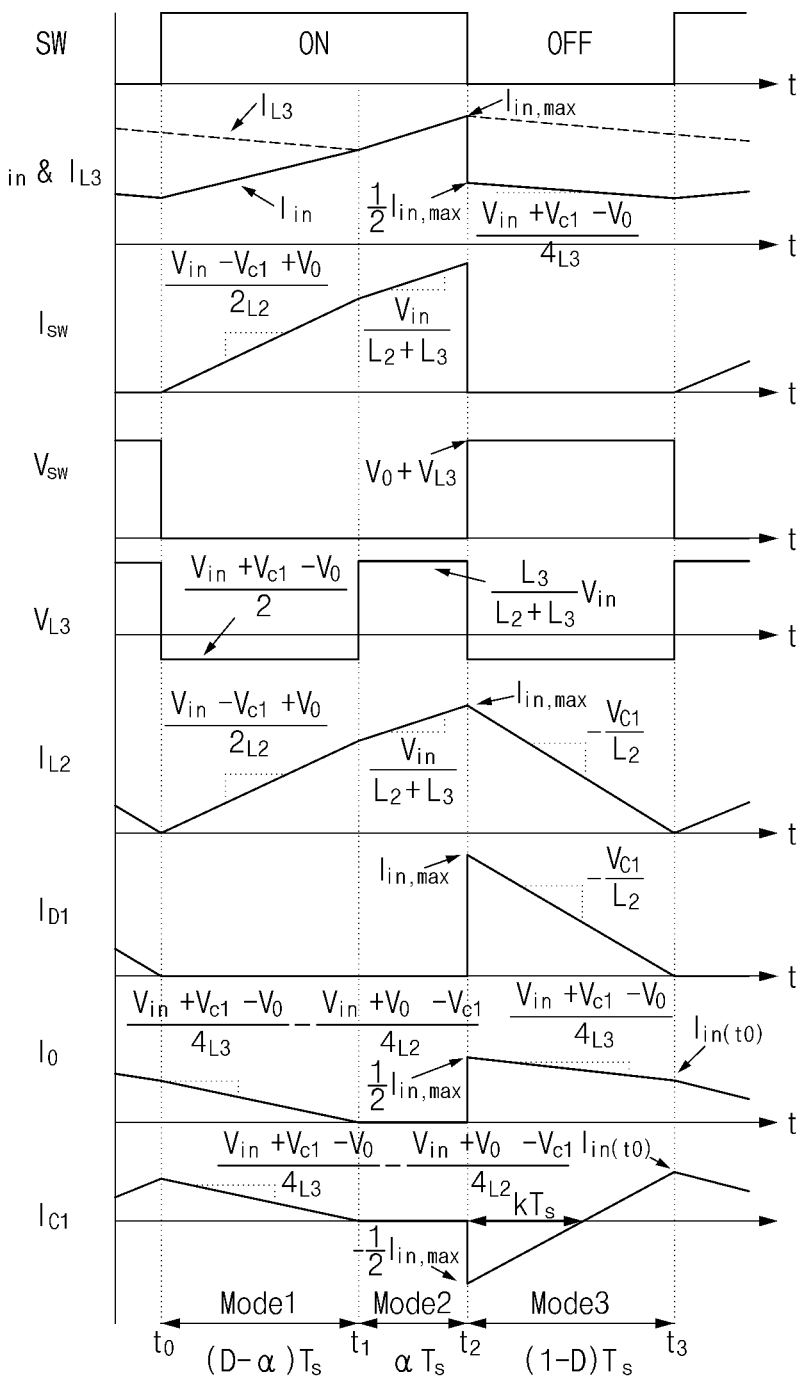
FIG. 3 is a diagram showing a graph with respect to an operation of a converter according to an embodiment disclosed herein.

FIGS. 2A to 2C are diagrams showing an operation of a converter according to an embodiment disclosed herein. FIG. 3 is a diagram showing a graph with respect to an operation of a converter according to an embodiment disclosed herein.

FIGS. 2A to 2C are diagrams showing a flow of a current with respect to an operation of the switch SW in the converter 100, respectively. When a period of the switch SW is $T_S$, FIG. 2A shows a flow of a current for $(D-\alpha)T_S$ immediately after short-circuiting (turn-on) of the switch SW (hereinafter, Mode 1), FIG. 2B shows a flow of a current from $(D-\alpha)T_S$ to $DT_S$ after short-circuiting (turn-on) of the switch SW (hereinafter, Mode 2), and FIG. 2C shows a flow of a current from $DT_S$ to $T_S$ after opening (turn-off) of the switch SW (hereinafter, Mode 3). In this case, D may be a real number equal to or greater than 0 and less than and equal to 1, and a may be a real number equal to or greater than 0 and less than and equal to D. Hereinafter, FIG. 3 will be referred to for describing FIGS. 2A to 2C.

Referring to FIG. 2A, for $(D-\alpha)T_S$ immediately after short-circuiting (turn-on) of the switch SW, a current may not flow through the first diode D1. The second diode D2 may be maintained turned on by the fourth inductor L4, such that an output current $I_o$ may be maintained and thus a ripple of the output current $I_o$ may be reduced. Moreover, a zero-current turn-on by the second inductor L2 serially connected to the switch SW is possible, thus increasing the efficiency of the converter 100.

Referring to FIG. 3, for a time of Mode 1 after the switch SW is short-circuited (turned on), a current $I_{L3}$ of the third inductor L3 may sequentially decrease and an input current $I_{in}$ may increase. A current $I_{SW}$ flowing through the switch SW may increase with a slope of $$\frac{V_{in} - V_{C1} + V_o}{2L_2}.$$

A voltage $V_{SW}$ applied to the switch SW may have a value of 0, and a voltage $V_3$ applied to the third inductor L3 may have a value of $$\frac{V_{in} + V_{C1} - V_o}{2}.$$

A current $I_{L2}$ flowing through the second inductor L2 may increase with a slope of $$\frac{V_{in} - V_{C1} + V_0}{2L_2}$$

($V_{in}$ is an input voltage), and a current $I_{D1}$ flowing through the first diode D1 may have a value of 0. A current $I_{C1}$ flowing through the first capacitor C1 may decrease with a slope of $$\frac{V_{in} + V_{C1} - V_0}{4L3} - \frac{V_{in} + V_0 - V_{C1}}{4L2},$$

and an output current $I_o$ may decrease with a slope of $$\frac{V_{in} + V_{C1} - V_0}{4L3} - \frac{V_{in} + V_0 - V_{C1}}{4L2}.$$

That is, the output current $I_o$ may gradually decrease without having a value of 0 simultaneously with short-circuiting (turn on) of the switch SW, such that the converter 100 may reduce a ripple of the output current $I_o$ when compared to a case where coupled inductors are not used.

Referring to FIG. 2B, for a time from $(D-\alpha)T_S$ to $DT_S$ after short-circuiting (turn on) of the switch SW, a current may not flow through the first diode D1, the first capacitor C1, the fourth inductor L4, the second diode D2, and the resistor R. For example, after a current based on energy stored in the fourth inductor L4 entirely flows, the current does not flow any more by the fourth inductor L4, such that the output current $I_o$ may have a value of 0 and the input current $I_{SW}$ may flow as the current $I_{SW}$ of the switch SW.

Referring to FIG. 3, for a time of Mode 2 after the switch SW is short-circuited (turned on), the input current $I_{in}$ and the current $I_{L3}$ flowing through the third inductor L3 may have the same value and increase. For example, the input current $I_{in}$ and the current $I_{L3}$ flowing through the third inductor L3 may increase until they have a value of $I_{in, max}$. The current $I_{SW}$ flowing through the switch SW may increase with a slope of $$\frac{V_{in}}{L2 + L3},$$

and the voltage $V_{SW}$ applied to the switch SW may have a value of 0 because the switch SW is short-circuited (turned on). The voltage $V_{L3}$ applied to the third inductor L3 may have a value of $$\frac{L3}{L2 + L3} V_{in},$$

and the current $I_{L2}$ flowing through the second inductor L2 may increase with a slope of $$\frac{V_{in}}{L2 + L3}.$$

The current $I_{D1}$ flowing through the first diode D1 may have a value of 0, and the current $I_{C1}$ flowing through the first capacitor C1 may have a value of 0. The output current $I_o$ does not flow, and thus may have a value of 0.

Referring to FIG. 2C, for a time from $DT_S$ to $T_S$ corresponding to a flow of a current after opening (turn off) of the switch SW, the current may flow through the other elements than the switch SW. For example, after opening (turn off) of the switch SW, by the second inductor L2 serially connected to the switch SW, the output current $I_o$ may linearly decrease and thus the ripple of the output current may be reduced.

Referring to FIG. 3, for a time of Mode 3 after the switch SW is opened (turned off), the input current $I_{in}$ and a current $I_{L3}$ of the third inductor L3 may decrease with a slope of $$\frac{V_{in} + V_{C1} - V_0}{4L3}$$

with a start value of $$\frac{I_{in,max}}{2},$$

and the current $I_{SW}$ flowing through the switch SW may have a value of 0. The voltage $V_{SW}$ applied to the switch SW may have a value of $V_o + V_{L3}$, and a voltage $V_{L3}$ applied to the third inductor L3 may have a value of $$\frac{V_{in} + V_{C1} - V_0}{2}.$$

A current $I_{L2}$ flowing through the second inductor L2 may decrease with a slope of $$-\frac{V_{C1}}{L2}$$

with a start value of $I_{in,max}$, and a current $I_{D1}$ flowing through the first diode D1 may decrease with a slope of $$-\frac{V_{C1}}{L2}$$

with a start value of $I_{in,max}$. A current $I_{C1}$ flowing through the first capacitor C1 may increase up to an initial value of $I_{in}$ from a start value of $$-\frac{1}{2} I_{in,max},$$

and an output current $I_o$ may decrease with a slope of $$\frac{V_{in} + V_{C1} - V_0}{4L3}$$

to the initial value of $I_{in}$ from a start value of $$\frac{1}{2} I_{in,max}.$$

That is, the converter 100 may reduce the ripple of the output current $I_o$ when compared to a conventional converter based on operations of the first inductor L1 and the fourth inductor L4 that are coupled inductors and an operation of the second inductor L2 serially connected to the switch SW, and an efficient circuit may be configured through zero current turn-on.

The converter 100 according to an embodiment disclosed herein may repeat short-circuiting (turn on) and opening (turn off) of the switch SW for periods of $T_S$, amplify a voltage of the battery that is the input voltage $V_{in}$ to generate the output voltage $V_o$, and reduce heat generation of the converter 100 caused by the ripple of the output current occurring in generation of the output voltage $V_o$.

The converter 100 according to an embodiment disclosed herein may further include a pair of coupled inductors (e.g., the first inductor L1 and the fourth inductor L4), the first capacitor C1, and the first diode D1 when compared to a conventional boost converter, thereby providing efficient voltage conversion where the ripple of the output current is reduced.

The converter 100 according to an embodiment disclosed herein may receive a voltage supplied from the power source P, and control an operation of the switch SW, thereby converting a voltage and providing the converted voltage to another device.

Figure 4:
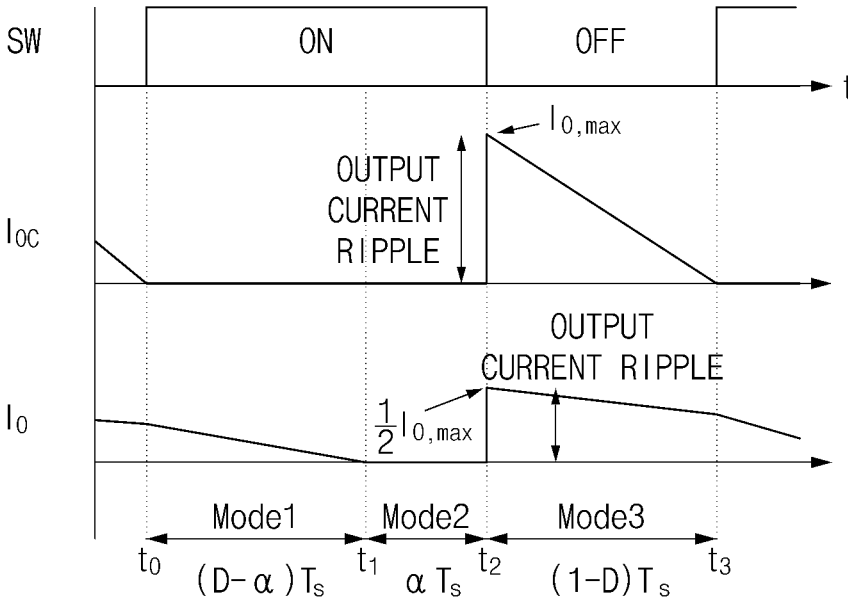
FIG. 4 is a diagram showing an output current ripple difference between when a converter according to an embodiment disclosed herein is used and when a conventional converter is used.

FIG. 4 is a diagram showing an output current ripple difference between when a converter according to an embodiment disclosed herein is used and when a conventional converter is used.

Referring to FIG. 4, in case of using a conventional converter, an output current $i_{oc}$ may have a value of 0 when a switch is short-circuited (turned on), and the output current $i_{oc}$ may have a value of $i_{o,max}$ when the switch is opened (turned off), resulting in an output current ripple. That is, in the conventional converter, when the switch is opened in a state of being short-circuited, a ripple having a value of $i_{o,max}$ of the output current $i_{oc}$ may continuously occur, such that heat generation of the converter (or battery) occurs, causing circuit damage.

In the case of the converter 100 according to an embodiment disclosed herein, when the switch is short-circuited (turned on), the output current $i_o$ may not have a value of 0 and a specific value thereof may be maintained by coupled inductors, and when the switch is opened (turned off), the output current $i_o$ may have a value of $$\frac{1}{2} I_{0,max},$$

such that a ripple of the output current $i_o$ may be reduced to a half compared to the case of using the conventional converter. That is, when the converter 100 is used, the ripple of the output current may be reduced when compared to the case of using the conventional converter, such that heat generation of the converter (or battery) may be reduced and the converter may efficiently operate in terms of energy.

Figure 5:
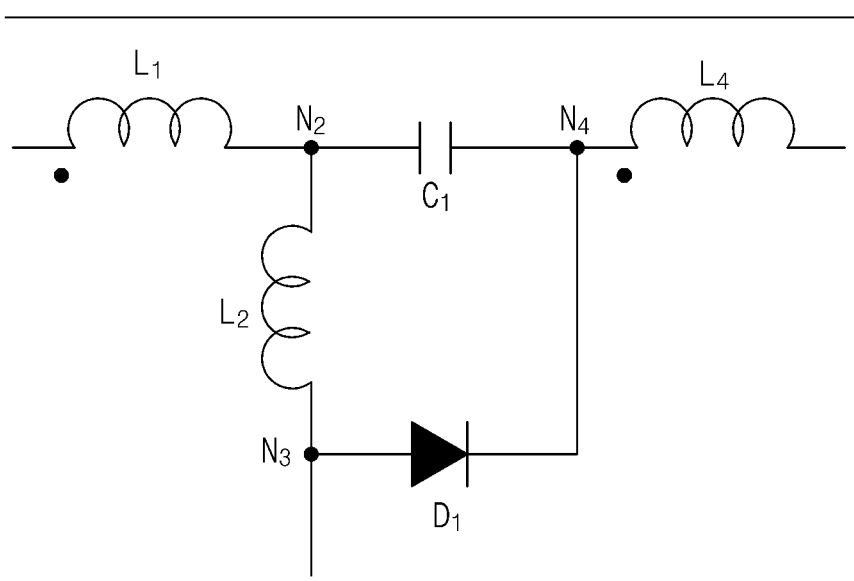
FIG. 5 is a diagram showing a converter according to another embodiment disclosed herein.

FIG. 5 is a diagram showing a converter according to another embodiment disclosed herein.

Referring to FIG. 5, a converter 200 according to another embodiment disclosed herein may further include a second capacitor C2 connected in parallel to the resistor R. That is, the second capacitor C2 may be connected in parallel to the resistor R at a sixth node N6. The second capacitor C2 may allow only a direct current component to be applied to the resistor R by detecting an alternating current component.

Figure 6:
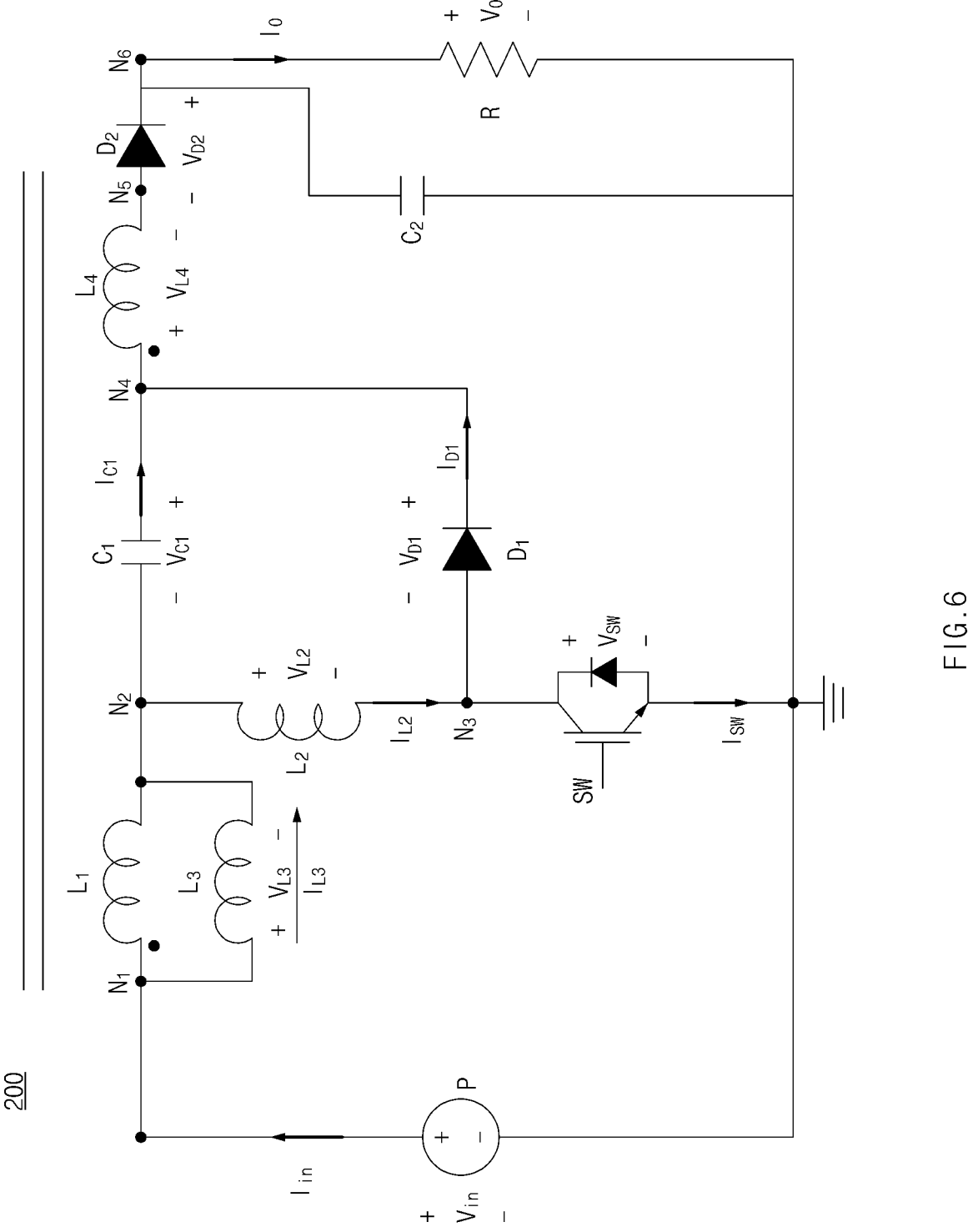
FIG. 6 illustrates a snubber circuit according to an embodiment disclosed herein.

FIG. 6 illustrates a snubber circuit according to an embodiment disclosed herein.

Referring to FIG. 6, a snubber circuit 300 according to an embodiment disclosed herein may include a capacitor C1, inductors L1, L2, and L4, and a diode D1.

The capacitor C1 may be connected to a first node N2 and a second node N4. For example, the first node N2 and the second node N4 may be different nodes.

The first inductor L1 may be connected to the capacitor C1. For example, the first inductor L1 may be connected to the capacitor C1 at the first node N2.

The second inductor L4 may be connected to the capacitor C1. For example, the second inductor L4 may be connected to the capacitor C1 at the second node N4 that is different from the first node N2. The second inductor L4 and the first inductor L1 may be coupled inductors.

The third inductor L2 may be connected to the first inductor L1 and the capacitor C1. For example, the third inductor L2 may be connected to the first inductor L1 and the capacitor C1 at the first node N2.

The diode D1 may be connected to the third inductor L2 at the third node N3, and may be connected to the capacitor C2 and the second inductor L4 at the second node N4. For example, the diode D1 may be connected in a direction from the third node N3 to the second node N4.

The snubber circuit 300 according to an embodiment disclosed herein may be included in a boost converter. For example, the boost converter may reduce an output current ripple by including the snubber circuit 300. In another example, in the snubber circuit 300, a first inductor L1' may be connected to a battery at a node that is different from the first node N2, the third inductor L2 and the diode D1 may be connected to a switch at the third node N3, and the second inductor L4 may be connected to an output terminal of the boost converter at a node that is different from the second node N4. In this case, the first inductor L1 and the second inductor L4 are coupled inductors, such that the boost converter may maintain an output current when the switch is short-circuited (turned on), thus reducing a ripple of the output current. The boost converter may zero-current turn on the switch by an operation of the third inductor L2 serially connected to the switch, thus implementing an efficient circuit.

Figure 7:
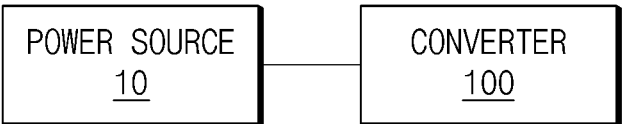
FIG. 7 illustrates a battery charging apparatus according to an embodiment disclosed herein.

FIG. 7 illustrates a battery charging apparatus according to an embodiment disclosed herein.

Referring to FIG. 7, a battery charging apparatus 1000 according to an embodiment disclosed herein may include a power source 10 and a converter 100. In an embodiment, the converter 100 may be substantially the same as the converter 100 of FIG. 1.

The power source 10 may supply power to the converter 100. For example, the power source 10 may supply at least any one of an alternating current voltage or a direct current voltage to the converter 100.

The converter 100 may be supplied with a voltage from the power source 10. The converter 100 may boost or drop the voltage supplied from the power source 10. In an embodiment, the converter 100 may include at least any one of a boost converter, a buck converter, or a boost-buck converter.

The converter 100 may include a switch and a snubber circuit. For example, the snubber circuit may be a circuit for reducing an output current ripple of the converter 100. In an embodiment, the snubber circuit may include the snubber circuit 300 of FIG. 6. In an embodiment, the snubber circuit may include coupled inductors, and adjust the output current of the converter 100 even when the switch is short-circuited by the coupled inductors.

In the battery charging apparatus 1000 according to an embodiment disclosed herein, the converter 100 may boost or drop the voltage supplied from the power source 10, and may deliver the boosted or dropped voltage to the battery to charge the battery. Moreover, the battery charging apparatus 1000 may reduce the ripple of the output current by using the converter 100 in comparison to when using the conventional converter, and reduce heat generation of the battery (or charging system) based on reduction of the ripple of the output current, thereby providing efficient charging.

Even though all components constituting an embodiment of the present invention have been described above as being combined into one or operating in combination, the present invention is not necessarily limited to the embodiment. That is, within the object scope of the present invention, all the components may operate by being selectively combined into one or more.

Moreover, terms such as "include", "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art unless defined otherwise. The terms used generally like terms defined in dictionaries should be interpreted as having meanings that are the same as the contextual meanings of the relevant technology and should not be interpreted as having ideal or excessively formal meanings unless they are clearly defined in the present disclosure.

The above description is merely illustrative of the technical idea of the present invention, and various modifications and variations will be possible without departing from the essential characteristics of the present invention by those of ordinary skill in the art to which the present invention pertains. Therefore, the embodiments disclosed in the present invention are intended for description rather than limitation of the technical spirit of the present invention, and the scope of the technical spirit of the present invention is not limited by these embodiments. The protection scope of the present disclosure should be interpreted by the following claims, and all technical spirits within the same range should be understood to be included in the range of the present disclosure.

The invention claimed is:

1. A converter comprising:
a first inductor connected to a power source at a first node;
a second inductor connected to the first inductor at a second node;
a third inductor connected in parallel to the first inductor at the first node and the second node, the third inductor being connected to the power source through the first node and the second inductor through the second node;
a switch connected in series to the second inductor at a third node;
a first diode connected to the second inductor and the switch at the third node;
a first capacitor connected to the first inductor and the second inductor at the second node and connected to the first diode at a fourth node;
a fourth inductor connected to the first diode and the first capacitor at the fourth node;
a second diode connected to the fourth inductor at a fifth node; and
a resistor connected to the second diode at a sixth node,
wherein the first inductor and the fourth inductor are coupled inductors.

2. The converter of claim 1, wherein the switch comprises a bipolar junction transistor (BJT) and a third diode.

3. The converter of claim 1, wherein the switch is short-circuited and opened for specific periods.

4. The converter of claim 1, wherein the first diode is connected in a direction from the third node to the fourth node.

5. The converter of claim 1, wherein the second diode is connected in a direction from the fifth node to the sixth node.

6. The converter of claim 1, wherein a voltage applied to the resistor is an output of the converter.

7. The converter of claim 1, further comprising a second capacitor connected in parallel to the resistor.

8. The converter of claim 1, wherein, when the switch is short-circuited, a current of the third inductor decreases.

9. The converter of claim 1, wherein a path between the third node and the fourth node only includes the first diode.

10. The converter of claim 1, wherein the third inductor does not have an end directly connected to ground.

11. The converter of claim 1, wherein the first capacitor is connected to the third inductor at the second node.

12. A snubber circuit comprising:

a capacitor;

a first inductor connected to a power source at a first node and the capacitor at a first second node;

a second inductor connected to the first inductor and the capacitor at the second node;

a third inductor being connected in parallel to the first inductor at the first node and the second node, the third inductor being connected to the power source through the first node and being connected to the capacitor and the second inductor at the second node;

a fourth inductor connected to the capacitor at a fourth node; and a diode comprising a first end connected to the second inductor at a third node and a second end connected to the capacitor and the fourth inductor at the fourth node, wherein the first inductor and the fourth inductor are coupled inductors.

13. The snubber circuit of claim 12, wherein the diode is connected in a direction from the third node to the fourth node.

14. The snubber circuit of claim 12, wherein the snubber circuit is included in a boost converter.

15. A battery charging apparatus comprising:

a power source; and a converter comprising a switch and a snubber circuit, and configured to be supplied with a voltage from the power source to boost or drop the voltage, wherein the snubber circuit comprises:

a first inductor connected to the power source at a first node, a second inductor connected to the first inductor at a second node, and a third inductor connected in parallel to the first inductor at the first node and the second node, the third inductor being connected to the power source through the first node and the second inductor through the second node, wherein, when the switch is short-circuited, an output current of the converter is adjusted by the first inductor.

\* \* \* \* \*